March 21, 1961 N. S. TERRY 2,976,366

TELEPHONE STATION IDENTIFICATION SYSTEM

Filed July 9, 1958 3 Sheets-Sheet 1

INVENTOR
N. S. TERRY
BY V. P. Briolo
ATTORNEY

INVENTOR
N.S. TERRY
BY V. P. Briolo
ATTORNEY

March 21, 1961 N. S. TERRY 2,976,366

TELEPHONE STATION IDENTIFICATION SYSTEM

Filed July 9, 1958 3 Sheets-Sheet 3

INVENTOR
N.S. TERRY
BY V. P. Priolo

ATTORNEY 2,976,366

TELEPHONE STATION IDENTIFICATION SYSTEM

Noah S. Terry, Freeport, N.Y., assignor to Bell Telephone Laboratories, Incorporated, New York, N.Y., a corporation of New York Filed July 9, 1958, Ser. No. 747,426

3 Claims. (Cl. 179—8.5)

This invention relates to automatic telephone systems and more particularly to improved means for identifying calling stations in a dial switching system.

The expansion of automatic telephone systems to serve larger areas and to provide means for subscriber dialing of toll calls to adjacent areas through the advent of automatic message accounting has made it necessary to provide accurate and reliable means for automatically identifying all types of subscribers, on individual or party lines, in order that charges may be properly billed.

With systems of the prior art it has not generally been possible to identify more than four subscribers on a common line without the intervention of an operator.

An object of the present invention is to provide means for automatically and positively identifying any station originating a call, whether over a separate line or a party line.

Another object of the present invention is to provide means for automatically and positively identifying any party station originating a call on a party line serving any desirable number of subscribers.

A further object of the present invention is to provide means for automatically and positively identifying each of a plurality of subscribers served by a common group of lines to a central office in a line concentrator installation.

To accomplish the foregoing objects, the invention features a direct-current pulse transmitting dial mechanism designed also to transmit an alternating-current signal provided by a magnetically recorded pattern representing the subscriber's directory number. Transmission of the signal takes place between the instant the dial is released at the end of its forward stroke and the instant the first closure of its direct-current pulsing contacts occurs.

In a preferred embodiment of the invention the dial shaft which normally carries the direct-current pulsing contacts is extended to provide support for a drum member. On the rim or flange of the drum, means are provided for securing a strip of magnetic recording tape. The backing of the tape may be an adhesive material which will facilitate its being secured to the flange of the drum. Mounted in proximity to the magnetic tape is a magnetic core structure having a winding thereon in which will be induced the alternating-current signal representing the pattern magnetically recorded on the tape. The output of the coil is connected to the input side of an amplifier which may be of the transistor type. The output of the amplifier is passed through a bandpass filter and then through coupling condensers to the subscriber's line conductors. The record on the magnetic tape may be recorded in the well known two-out-of-five code; the record consisting of a three-digit office code, a four-digit numerical code and, if required, a station digit.

The train of generated alternating-current information will be transmitted over the subscriber's pair to the central office. Each digit signal will cause the operation of a two-out-of-five multifrequency register, one register being provided for each digit. The multifrequency registers will recognize and store the several digits for subsequent use.

The registers may be equipped with a two-out-of-five validity check circuit which will actuate an alarm should any digit received during a dial stroke differ from the digit received during a prior dial stroke.

The switching train and circuits in the central office may be of the type shown in Patent 2,244,500, granted to H. Nyquist on June 3, 1941.

The nature of the invention and its distinguishing features and advantages will be more clearly understood from the following detailed description and the accompanying drawings in which.

Figure 1:
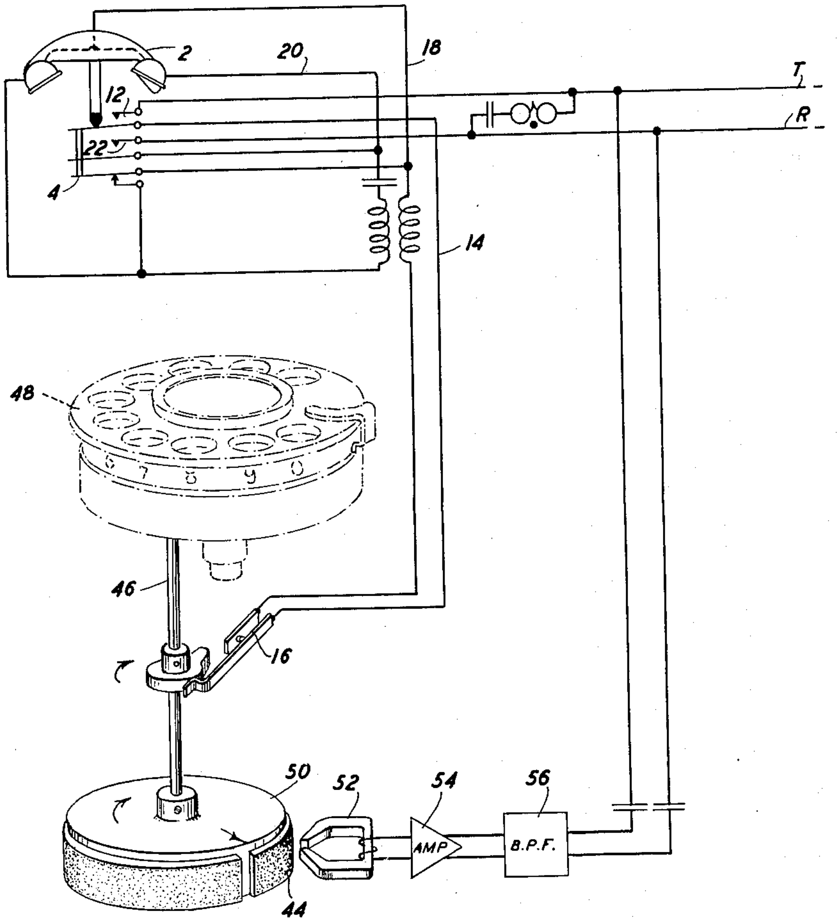
Fig. 1 is a schematic representation of a preferred embodiment of the invention showing the features which are located at the subscriber's station.
Figure 2:
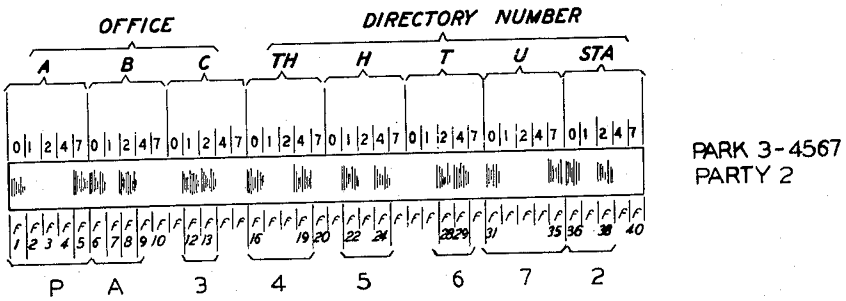
Fig. 2 illustrates the application of the two-out-of-five code to a subscriber's directory number.

Referring now to the drawings, the lifting of handset 2 from its cradle will actuate switch 4 which will, in turn, close an energizing path for relay 6. This path includes the right winding of relay 6 which is connected to ground, conductors 8, 10 and T, contact 12 of switch 4, conductor 14, pulsing contacts 16, conductors 18 and 20, contact 22 of switch 4, conductors R, 24 and 26, and the left winding of relay 6 which is connected to battery. The operation of relay 6 will connect contact 28 to ground and thereby energize relay 30 over the path which includes conductor 32. The operation of relay 30 closes contacts 34 and 36 to connect one side of transformer 38 to the line conductors T and R. The other winding of transformer 38 is connected to the common channel 40 by way of amplifier 42. The multifrequency receiving circuits, now connected to the station, are ready to receive the information magnetically recorded on tape 44.

As is well known, dial shaft 46 will rotate only after dial 48 is released at the end of its forward stroke. In other words, shaft 46 rotates only when dial 48 rotates in a counterclockwise direction. It will be understood, therefore, that pulsing contacts 16 will remain closed and the magnetic tape supporting drum 50 will remain stationary until the dial is released at the end of its clockwise rotation. When dial 48 is released, shaft 46 and drum 50 will make a complete revolution and contacts 16 will break and make once for each digit included in the forward stroke of the dial. Each time drum 50 rotates the pattern magnetically recorded on tape 44 will induce an alternating-current signal in the winding of magnetic core 52. This will occur the first time between the instant the drum is released and the instant contacts 16 close for the first time after their first break. This signal will pass through amplifier 54 and filter 56 to the common channel 40 by way of conductors T and R, contacts 34 and 36, transformer 38 and amplifier 42. Relay 30 is a slow release relay. Contacts 34 and 36, therefore, remain closed during the time intervals that pulsing contacts 16 are opened by the release of dial 48.

Figure 3:
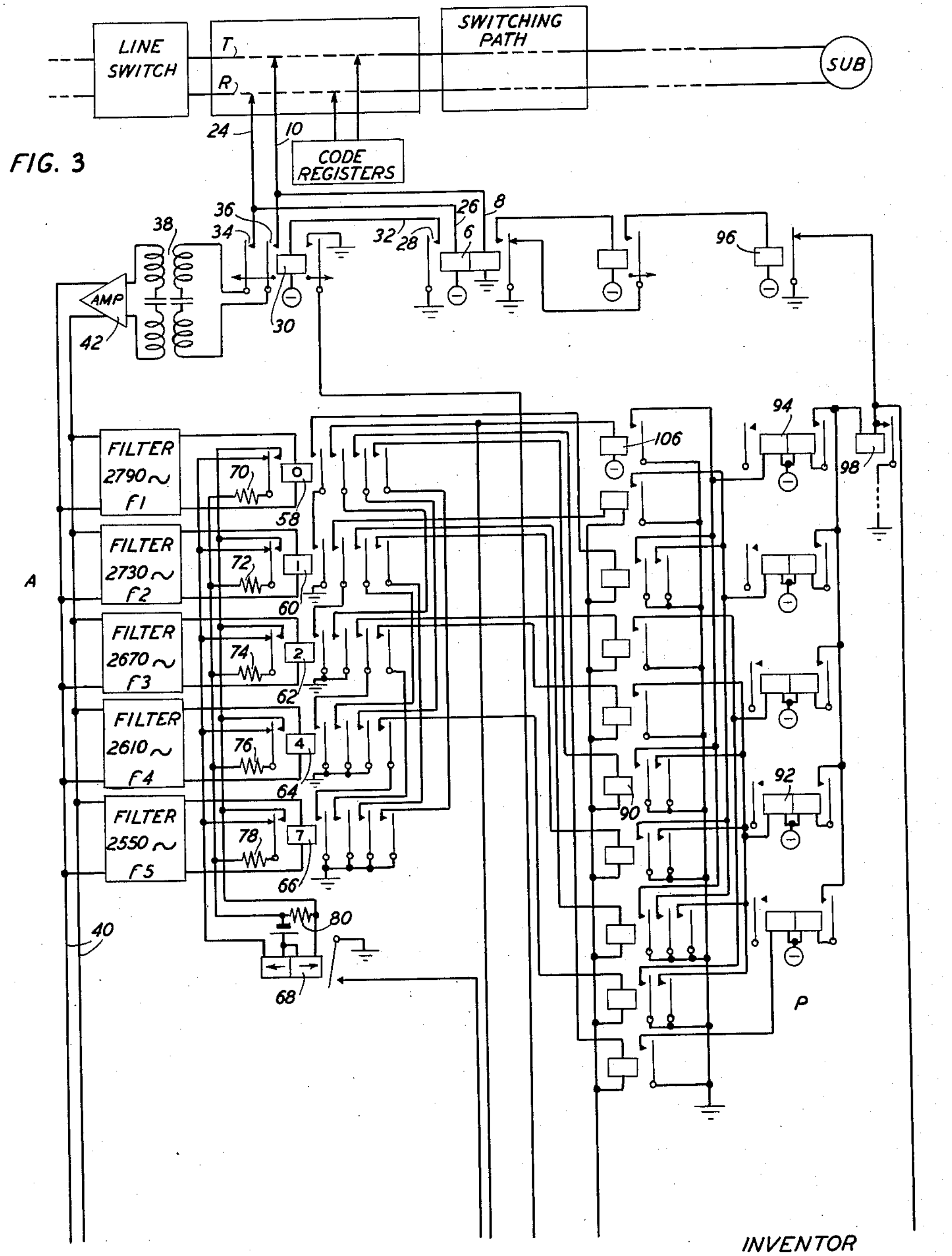
Figs. 3 and 4 show the circuits and registers provided in the central office, in accordance with the teachings of the above-identified Nyquist patent, to respond to the signal transmitted from the subscriber's station.
Figure 4:
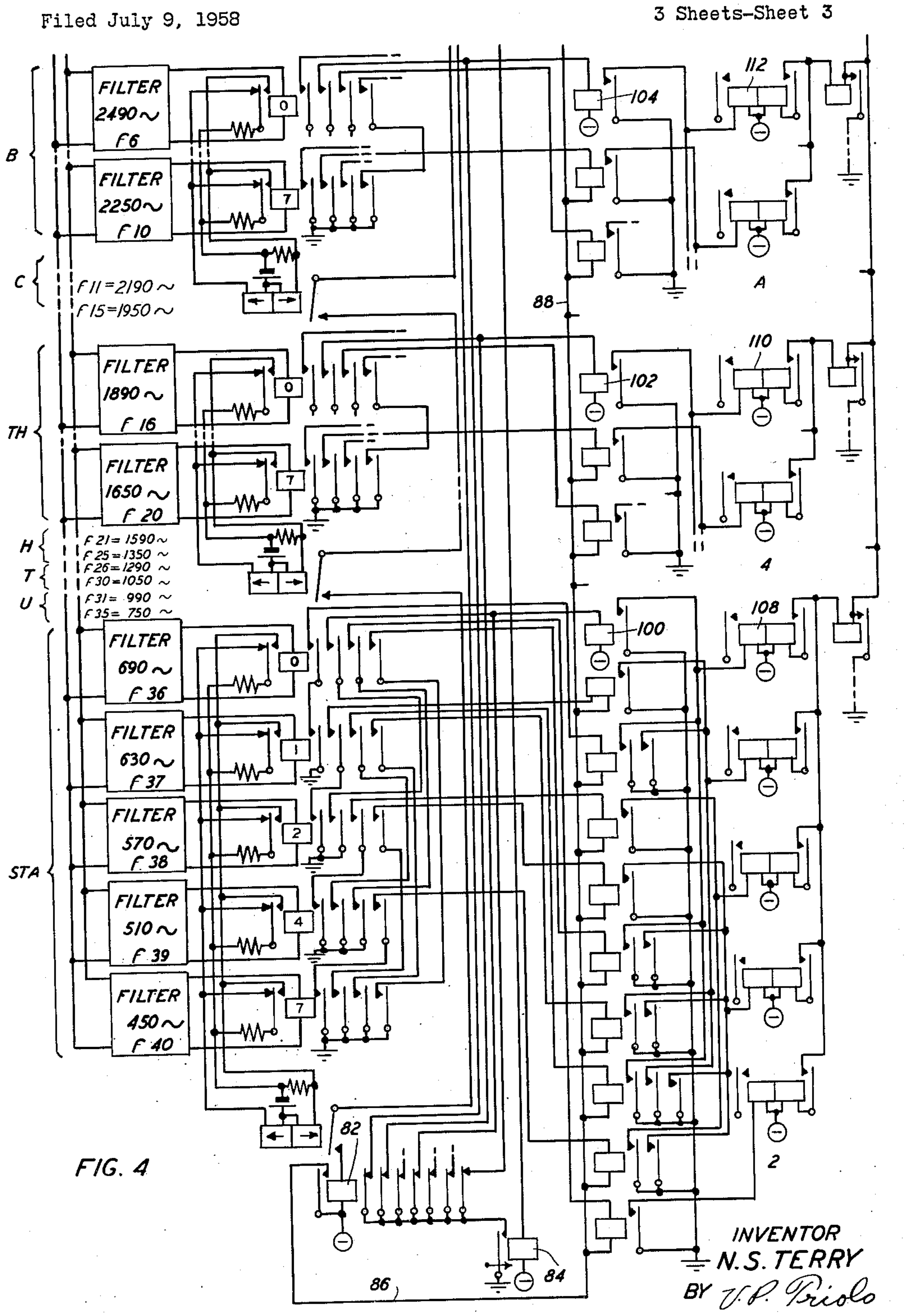

In accordance with the teachings of Patent 2,244,500 and, as shown in Figs. 3 and 4, eight groups of frequency receiving circuits, each group consisting of five distinct channels, are connected to the common circuit 40. These groups are indicated on the drawings by the letters A, B, C, TH, H, T, U and STA. Each channel is equipped with a distinctly tuned filter which is indicated by the frequency which it selectively passes.

The code proving circuits associated with each group of filters comprise five neutral relays and a differential relay. For example, for group A, relays 58, 60, 62, 64 and 66 are the neutral relays and relay 68 is the differential relay. Under normal conditions there are five equal resistances (70, 72, 74, 76 and 78), connected across the left winding of each differential relay and a single resistance (80), having a value equal to one of the other five resistances, connected across the right winding. Under this condition there exists an unbalance between the currents in the two windings so that the differential relay of each group is normally operated. Upon the receipt of two frequencies by each group of frequency receiving circuits, two of the neutral relays operate to transfer two of the five resistances from across the left winding of the differential relay to the circuit including the right winding. There are then three equal resistances connected across each winding of the differential relay which produces a condition of current balance. The differential relays accordingly release their armatures. Any deviation from the correct number of frequencies, that is two frequencies, preserves the normal condition of unbalance and the differential relays remain operated.

When the correct number of two frequencies per digital position are received at the central office, two of the neutral relays in each of the code proving circuits will operate and thereby cause the release of all the differential relays. An obvious operating circuit is thereupon established for relay 82 (Fig. 4). Since relay 84 is slow to operate, relay 82 operates before relay 84 and renders ineffective, at this time, the ground potential connected to the right armatures of relay 82 by the operation of relay 84.

Assuming for descriptive purposes that the letter P of the telephone designation is characterized by the two frequencies 2790 and 2550 cycles, the filters so indicated in group A will pass these frequencies and cause relays 70 and 78, which are tuned to these frequencies, to operate. A circuit is thereupon established extending from grounded battery, left armature and front contact of relay 82, conductors 86 and 88, winding of relay 90, front contact and fourth right armature of relay 70, front contact and fourth right armature of relay 78 to ground. Relay 90 operates in this circuit and establishes operating circuits for relays 92 and 94 of register P. Relays 92 and 94 lock to ground at the armature and back contact of relay 96 in a circuit including the winding of relay 98. Relay 98 operates in this circuit and locks relays 92 and 94 to ground independently of the ground at the armature of relay 96. The designation character P is accordingly stored in register P for subsequent use in identifying the calling station. Each of the remaining characters and digits in the directory number is stored in a similar manner, as described above and in previously mentioned Patent 2,244,500.

If in the transmission of the character P only one of the two frequencies is received at the central office, only one of the tuned relays will operate. Differential relay 68 will accordingly remain operated due to the current unbalance in its windings. Even though each of the remaining digits of the designation is identified by the correct number of frequencies, the circuit to relay 82 will be open at the contacts of the relay 68. Relay 82 will, therefore, remain unoperated and when slow-to-operate relay 84 operates, ground potential will be connected to the windings of relays 100, 102, 104 and 106 and to the windings of corresponding relays in groups C, H, T and U. The first register relay, such as 108, 110, 112 and 94, in each register will then operate to register the fact that an incorrect code has been transmitted, and route the call to an intercepting operator's position. Upon the receipt of such a call the operator will ascertain the directory number of the calling party.

It is to be understood that the above-described arrangements are illustrative of the application of the principles of the invention. Other arrangements may be devised by those skilled in the art without departing from the spirit and scope of the invention.

What is claimed is:

1. In a calling device, a dial having a normal position and rotatable in one direction from the normal position to another position and rotatable in a second direction to return from said other position to said normal position, a shaft, a set of normally closed pulsing contacts, a cam and a magnetic record member coaxially mounted on said shaft, a signal recorded on said record member, a magnetic core winding disposed in close proximity to said member, means responsive to the movement of said dial in said second direction to the normal position for rotating said shaft and cam to open and close said pulsing contacts a variable number of times in accordance with the degree of rotation of said dial and for rotating said record member to induce said recorded signal in said magnetic core winding between the instant said dial starts to move in said second direction and the instant the first closure of said pulsing contacts occurs after their first break.

2. An automatic telephone system including a central office, a line terminating therein, a plurality of stations on said line, and a calling device at each station, said calling device comprising a dial having a normal position and rotatable in one direction from the normal position to another position and rotatable in a second direction to return from said other position to said normal position, a shaft, a set of normally closed pulsing contacts connected to said line in a direct-current circuit, a cam and a magnetic record member coaxially mounted on said shaft, an alternating-current signal representing the directory number of the station recorded on said record member, a magnetic core winding disposed in close proximity to said member, said winding being connected to said line, and means responsive to the movement of said dial in said second direction to said normal position for rotating said shaft and cam to open and close said pulsing contacts to interrupt said direct-current line circuit a variable number of times in accordance with the degree of rotation of said dial and for rotating said record member to induce said directory number signal in said magnetic core winding and transmit said signal to said central office between the instant said dial starts to move in said second direction and the instant the first closure of said pulsing contacts occurs after their first break.

3. A telephone system including a central office, a line terminating therein, a station connected to said line, and a calling device at said station, said calling device comprising a dial having a normal position and rotatable in one direction from the normal position to another position and rotatable in a second direction to return from said other position to said normal position, a set of pulsing contacts connected to said line in a direct-current circuit, a circuit interrupter, a magnetic record member, a signal recorded on said record member, a magnetic core winding disposed in close proximity to said member, said winding being connected to said line, and means responsive to the movement of said dial in said second direction to said normal position for operating said interrupter to open and close said pulsing contacts to interrupt said direct-current line circuit a variable number of times in accordance with the degree of rotation of said dial and for moving said record member relative to said magnetic core winding in such manner as to induce said recorded signal in said winding within the time interval said pulsing contacts remain open between a closure of said contacts and the next succeeding closure of said contacts.

References Cited in the file of this patent

UNITED STATES PATENTS

| | | |
|---|---|---|
| 2,202,474 | Vroom | May 28, 1940 |
| 2,277,228 | Hecht | Mar. 24, 1942 |
| 2,283,610 | Mohr | May 19, 1942 |
| 2,558,187 | Marrison | June 26, 1951 |
| 2,567,812 | Hickman | Sept. 11, 1951 |
| 2,733,297 | Matlack et al. | Jan. 31, 1956 |